(12) United States Patent
Arce et al.

(10) Patent No.: US 11,674,497 B2
(45) Date of Patent: Jun. 13, 2023

(54) WIND TURBINE BLADE AND A METHOD OF OPERATING SUCH A WIND TURBINE BLADE

(71) Applicant: LM Wind Power International Technology II ApS, Kolding (DK)

(72) Inventors: Carlos León Arce, Diemen (NL); Jesper Madsen, Gesten (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 70 days.

(21) Appl. No.: 16/640,291

(22) PCT Filed: Aug. 22, 2018

(86) PCT No.: PCT/EP2018/072608
§ 371 (c)(1),
(2) Date: Feb. 19, 2020

(87) PCT Pub. No.: WO2019/038313
PCT Pub. Date: Feb. 28, 2019

(65) Prior Publication Data
US 2021/0079885 A1 Mar. 18, 2021

(30) Foreign Application Priority Data

Aug. 23, 2017 (EP) .................................... 17187522

(51) Int. Cl.
*F03D 1/06* (2006.01)
*F03D 3/06* (2006.01)
*B29L 31/08* (2006.01)

(52) U.S. Cl.
CPC ........... *F03D 1/0683* (2013.01); *F03D 3/061* (2013.01); *B29L 2031/085* (2013.01);
(Continued)

(58) Field of Classification Search
CPC .. F03B 1/0683; F03B 3/061; B29L 2031/085; F05B 2240/301; F05B 2240/31;
(Continued)

(56) References Cited

U.S. PATENT DOCUMENTS 2,400,388 A * 5/1946 Campbell ............ B64D 27/023
244/113
2,428,936 A * 10/1947 Hunter ..................... B64C 9/32
244/113
(Continued)

FOREIGN PATENT DOCUMENTS

EP 2647835 A1 10/2013
EP 2778392 A1 9/2014
(Continued)

*Primary Examiner* — David E Sosnowski
*Assistant Examiner* — Wayne A Lambert
(74) *Attorney, Agent, or Firm* — Nath, Goldberg & Meyer; Jerald L. Meyer; Tanya E. Harkins

(57) ABSTRACT

This invention relates to an airfoil modifying device, a wind turbine blade and a method of modifying an airfoil profile of the wind turbine blade. The airfoil modifying device comprises a deformable element connected to a filler element, both configured to deform between a retracted position and an extended position. The airfoil modifying device is passively deformed by the local air pressure acting on the blade surface and thus the airfoil modifying device.

13 Claims, 4 Drawing Sheets

(52) U.S. Cl.
CPC ... *F05B 2240/301* (2013.01); *F05B 2240/311* (2013.01); *F05B 2280/6003* (2013.01)

(58) Field of Classification Search
CPC ........ F05B 2240/311; F05B 2280/6003; Y02E 10/72; Y02E 10/74; F03D 1/0683; F03D 3/061
See application file for complete search history.

(56) References Cited

U.S. PATENT DOCUMENTS

| | | | | |
|---|---|---|---|---|
| 3,136,501 | A * | 6/1964 | Barber | B64C 3/46 244/219 |
| 3,466,220 | A * | 9/1969 | Forbes | B32B 3/12 428/118 |
| 4,613,102 | A * | 9/1986 | Kageorge | B64D 15/166 244/134 A |
| 5,106,265 | A * | 4/1992 | Holzem | F03D 7/0252 416/23 |
| 5,160,102 | A * | 11/1992 | Hlavac | B64D 15/166 244/134 A |
| 5,433,404 | A * | 7/1995 | Ashill | B64C 3/44 244/200 |
| 6,076,776 | A * | 6/2000 | Breitbach | F01D 17/162 244/219 |
| 6,142,425 | A * | 11/2000 | Armanios | B64C 23/00 239/562 |
| 6,443,394 | B1 * | 9/2002 | Weisend, Jr. | B64D 15/166 244/134 A |
| 8,061,986 | B2 * | 11/2011 | Xiong | F03D 7/022 416/23 |
| 8,128,364 | B2 * | 3/2012 | Pesetsky | F03D 1/0675 416/91 |
| 8,157,533 | B2 * | 4/2012 | Godsk | F03D 7/022 416/240 |
| 8,251,656 | B2 * | 8/2012 | Stiesdal | F03D 7/0232 416/23 |
| 8,251,657 | B2 * | 8/2012 | Obrecht | F03D 7/0256 416/23 |
| 8,418,967 | B2 * | 4/2013 | Hemmelgarn | B64C 3/48 244/219 |
| 8,444,384 | B2 * | 5/2013 | Pesetsky | F03D 7/0232 416/23 |
| 8,899,923 | B2 * | 12/2014 | Hancock | F03D 7/0232 416/23 |
| 9,267,491 | B2 * | 2/2016 | Vossler | F03D 1/0675 |
| 10,677,217 | B2 * | 6/2020 | Herrig | F03D 7/022 |
| 10,968,887 | B2 * | 4/2021 | Akay | F03D 1/0675 |
| 2003/0091436 | A1 * | 5/2003 | Stiesdal | F03D 1/0641 416/1 |
| 2010/0104436 | A1 * | 4/2010 | Herr | F03D 80/00 416/31 |
| 2012/0063896 | A1 * | 3/2012 | Obrecht | F03D 7/0252 416/31 |
| 2012/0141271 | A1 * | 6/2012 | Southwick | F03D 7/0232 416/23 |
| 2012/0141278 | A1 * | 6/2012 | Carroll | F03D 7/022 416/147 |
| 2013/0209255 | A1 * | 8/2013 | Pesetsky | F03D 1/0633 416/9 |
| 2014/0112780 | A1 * | 4/2014 | Herrig | F03D 1/0641 416/1 |
| 2014/0356181 | A1 * | 12/2014 | Mailly | F03D 1/0641 416/229 A |
| 2016/0369775 | A1 * | 12/2016 | Gonzalez | F03D 1/0683 |
| 2018/0010579 | A1 * | 1/2018 | Akay | F03D 7/022 |
| 2018/0171975 | A1 * | 6/2018 | Rohm | B64C 9/20 |

FOREIGN PATENT DOCUMENTS

| | | |
|---|---|---|
| EP | 2784301 A1 | 10/2014 |
| EP | 2816227 A1 | 12/2014 |
| WO | 2015091797 A1 | 6/2015 |

* cited by examiner

WIND TURBINE BLADE AND A METHOD OF OPERATING SUCH A WIND TURBINE BLADE

This is a National Phase Application filed under 35 U.S.C. 371 as a national stage of PCT/EP2018/072608, filed Aug. 22, 2018, an application claiming the benefit of European Application No. 17187522.2, filed Aug. 23, 2017, the content of each of which is hereby incorporated by reference in its entirety.

TECHNICAL FIELD

The present invention relates to an airfoil modifying device comprising a deformable element configured to deform between a retract position and an extended position, wherein the deformable element is passively deformed by a local air pressure acting on the airfoil modifying device.

The present invention further relates to a wind turbine blade comprising a pressure side and a suction side, wherein said airfoil modifying device is arranged on one of said sides.

The present invention also relates to a method of modifying airfoil profile of a wind turbine blade using the above airfoil modifying device, wherein the original airfoil is passively modified as function of the local air pressure acting on the blade surface.

BACKGROUND

Wind turbine blades may in some instances be provided with a high cambered airfoil profile, wherein the local camber varies along the chord length of the airfoil profile. The local maximum camber further differs along the blade length of the wind turbine blade. At some instances, local air bubbles may form at the blade surface due to the gradients of the curvature of that blade surface. The local air flow may further pass the trailing edge at an undesirable angle, thereby increasing the noise generation.

It is known to integrated or attach lift modifying means into or to the wind turbine blade in an effort to enhance the lift performance. Actively controlled lift modifying means may be incorporated into the airfoil profile of the wind turbine blade during manufacture, however, this adds to the complexity of the manufacturing process and increases the costs. Furthermore, the actively controlled components require regular additional maintenance, which increases the overall service costs.

EP 31115596 A1 discloses a wind turbine blade with a lift modifying device attached to the pressure side, wherein the lift modifying device extends from the trailing edge towards the leading edge. The lift modifying device has a solid continuous flexible profile which is adapted to fit the original airfoil profile of the wind turbine blade. This changes the original airfoil profile into a fixed modified airfoil profile.

EP 1952015 B1 discloses a wind turbine blade with a lift modifying elastic member arranged on the pressure side, wherein the elastic member extends from the trailing edge towards the leading edge. The elastic member is actively deformed by means of linear actuators connected to the elastic member or a fluid distribution system pumping fluid in or out of a fluid chamber formed between the original blade surface and the elastic member. The operation of the actuators or pumps is controlled via a controller which, in turns, uses sensor signals to actively control the deformation of the elastic member. The original airfoil profile is thereby modified using actively controlled actuating means.

OBJECT OF THE INVENTION

An object of the invention is to provide a airfoil modifying device and a wind turbine blade that solves the abovementioned problems.

Another object of the invention is to provide a airfoil modifying device and a wind turbine blade where the lift can be passively controlled.

Yet another object of the invention is to provide an airfoil modifying device and a wind turbine blade that improves the lift performance at negative angles of attacks.

DETAILED DESCRIPTION OF THE INVENTION

One object of the invention is achieved by a airfoil modifying device for a wind turbine blade, the wind turbine blade comprising a blade shell having an original airfoil profile which defines a pressure side and a suction side, wherein the airfoil modifying device is configured to be arranged on the pressure side or suction side of said wind turbine blade and to modify said original airfoil profile, the airfoil modifying device comprising at least a deformable element extending along said pressure or suction side from a first edge to a second edge and further from a first end to a second end when attached, wherein said deformable element is configured to deform between a retracted position and an extended position, characterised in that the deformable element is passively deformed, when attached, by means of a local air pressure acting on said airfoil modifying device.

This provides a passive airfoil modifying device which is deformed by the local air pressure acting on the airfoil modifying device. No actively controlled components are needed to deform the airfoil modifying device. The deformation is thus determined as function of the local air pressure as no evaluation of sensor signals is needed. This provides a cheap and simple way of modifying the original airfoil profile of the wind turbine blade, since no complex control systems are needed.

The present airfoil modifying device is suitable for wind turbine blades having a chambered airfoil profile, particularly a high chambered airfoil profile. The present airfoil modifying device may suitable be arranged on one blade surface so that the local chamber and thus the local blade thickness is modified upon deformation of the airfoil modifying device. Dependent on the airfoil profile, an airfoil modifying device may alternatively be arranged on both blade surfaces. This modifies the original airfoil profile of the wind turbine blade.

The airfoil modifying device comprises at least a deformable element defining an outer surface which is configured to deform in a flapwise direction, when attached, relative to a corresponding blade surface. The deformable element is configured to elastically move, e.g. deform, between a retracted positon and an extended position. The deformable element extends from a first end to a second end and further from a first edge to a second edge. Extending the deformable element modifies the original blade surface and thus alters the local airflow over the blade surface.

According to one embodiment, the airfoil modifying device further comprises a filler element connected to said deformable element, wherein said filler element is further configured to deform between said retracted position and said extended position.

The airfoil modifying device may further comprise a filler element arranged relative to the deformable element. The filler element may be configured to further deform between the retracted positon and the extended position in the flapwise direction. The filler element may extend along the inner surface of the deformable element and further in the flapwise direction. The filler element defines an inner surface facing the original blade surface, when attached. The filler element may thus follow the movement, e.g. deformation, of the deformable element.

The filler element may be suitably attached to the deformable element, e.g. using adhesive, welding, coupling elements, bolts, rivets or other attachment techniques. This also allows each element to be manufactured separately in an optimised process. For example, the filler element may be manufactured using extrusion, three-dimensional printing or another suitable process. Alternatively, the filler element may be integrally connected to the deformable element so that the filler and deformable elements form a single piece. This allows for a secure connection between the filler element and the deformable element and reduces the total manufacturing steps. This also allows for an easy installation of the airfoil modifying device.

In the retracted position, the filler element may be transformed into a compact state so that it may have a minimal height in the flapwise direction. In the extended position, the filler element may be transformed into an extended state so that it may have a maximum height in the flapwise direction. The filler element and deformable element may further be placed in any intermediate position or state between the retracted and extended positions.

According to one embodiment, said filler element comprises an open cell structure.

The filler element may have a flexible, e.g. elastic deformable, structure enabling it to transform between the compact and extended states. This also enables it to adapt to the curvature of the blade surface at the desired position.

The filler element may have an open celled structure forming a plurality of open cells arranged relative to each other. For example, the filler element may have a honeycomb structure or another open cell structure. For example, the filler element may comprise a plurality of interspaced walls, e.g. foldable or deformable walls, which together define a plurality of open cells. The individual walls may have any suitable shape or form. For example, the walls may extend along a side surface of the deformable element and/or be arranged at an inclined or right angle relative to the deformable element. This provides a lightweight and deformable structure.

Optionally, an inner element may extend along the inner surface of the filler element. The filler element may thus be sandwiched between this inner element and the deformable element. The inner element may further be attached or integrally connected to the filler element, as described earlier. The inner element may further be attached to the deformable element along the first and second ends and/or along the first and second edges. Thereby, forming a seal along the peripheral edge of the airfoil modifying device. This allows for a better control of the transformation of the structure of the filler element. This also allows for an increased attachment to the wind turbine blade.

The filler element may be made of a plastic or rubber material, such as polymer, e.g. Nylon®; neoprene; silicone; thermoplastic elastomers; EPDM; or butyl. Other suitable materials may be used for the filler element.

According to one embodiment, said deformable element is further configured to function as a semipermeable membrane, wherein air is able to pass through said semipermeable membrane.

The deformable element may be formed as a flexible element having a semipermeable structure, wherein air may enter and/or exit the airfoil modifying device through this semipermeable structure. For example, the deformable element may comprise integrated holes or spaces acting as breathing holes. The permeability of this semipermeable structure may be suitably selected so that the deformable element at the same time may be deformed, e.g. extended or retracted, by the local pressure. This allows for an equalisation between the local air pressure and an internal pressure of the airfoil modifying device. Said internal pressure may be an internal air pressure generated within a local chamber, as described later. This allows the deformable element to function as a semipermeable membrane capable of deforming as function of the local air pressure.

The semipermeable structure may extend along the entire outer surface so that air may enter and/or exit along the entire outer surface. The deformable element may thus be formed as a continuous semipermeable piece. Alternatively, the deformable element may comprise a number of semipermeable areas distributed along the outer surface, thus enabling air to enter and/or exit through these areas. These semipermeable areas may be partly or fully encircled by a number of non-permeable areas further arranged on the outer surface. For example, the semipermeable areas may be formed by machining holes into a single piece. For example, a number of semipermeable sub-pieces and a number of non-permeable pieces may be interconnected, e.g. welded or stitched together, to form the deformable element.

The deformable element and/or the inner element may be formed as a fabric or a sheet made of a suitable material or composite. For example, the deformable element and/or the inner element may be made of a plastic or rubber material, such as polymer, e.g. Nylon®; neoprene; silicone; thermoplastic elastomers; EPDM; or butyl. Other suitable materials or composites may be used for the deformable element and/or the inner element.

According to one embodiment, said deformable element comprises means for passively guiding air into and out of a local chamber, when attached, formed by said deformable element and an original blade surface of the wind turbine blade.

The airfoil modifying device may comprise integrated means for passively guiding air into and/or out of the local chamber. This also allows for an equalisation between the local air pressure and the internal pressure of the airfoil modifying device.

For example, the means may be formed as vent holes arranged in the deformable element and/or in the seal extending along the peripheral edge of the airfoil modifying device. The vent holes may be configured to guide air into the local chamber and/or guide air out of the local chamber. Alternatively, the airfoil modifying device may comprise first vent holes for guiding air into the local chamber and second vent holes for guiding air out of the local chamber.

For example, said means may also be formed as passively activated valve elements arranged in the deformable element and/or in the seal extending along the peripheral edge of the airfoil modifying device. Other types of means may be used for guiding air into or out of the local chamber.

If the airfoil modifying device is provided with integrated means for passively guiding air into and/or out of the local chamber, then the deformable element may comprise a nonpermeable structure or a semipermeable structure.

One object of the invention is also achieved by a wind turbine blade extending from a blade root to a tip end in a longitudinal direction and further from a leading edge to a trailing edge in a chordwise direction, the wind turbine blade comprising a blade shell having an original airfoil profile which is defines a pressure side and a suction side, wherein at least one airfoil modifying device is arranged on one of said pressure and suction sides and attached to said wind turbine blade, the at least one airfoil modifying device is configured to deform between a retracted position and an extended position, characterised in that said at least one airfoil modifying device is configured as described above and passively deformed by means of a local air pressure acting on said one of the pressure and suction sides, wherein said original airfoil profile is modified by deformation of the at least one airfoil modifying device relative to an original blade surface in a local flapwise direction.

This provides a wind turbine blade where the original airfoil profile is passively modified as function of the local air pressure distribution over the blade surface at which the airfoil modifying device is arranged. The wind turbine blade may comprise a cambered airfoil profile, preferably a high cambered profile. This reduces the risk of air bubbles forming on the cambered blade surface. This also improves the aerodynamic performance of the wind turbine blade at negative angles of attack, particularly very negative angles of attack.

The airfoil modifying device may be arranged on the pressure side, alternatively, on the suction side dependent on the particular airfoil profile. The airfoil modifying device may suitably be positioned on the aerodynamic portion of the wind turbine blade, alternatively, on transition portion of the wind turbine blade. The airfoil modifying device may also be positioned so that it extends partly onto both the aerodynamic portion and the transition portion. The airfoil modifying device may thus be used to improve the lift-to-drag ratio at certain angles of attack.

According to one embodiment, the deformable element of said at least one airfoil modifying device and the original blade surface form a local chamber, wherein a volume of said chamber is changed as function of said local air pressure.

As mentioned earlier, the airfoil modifying device may form a local chamber when attached to the wind turbine blade. For example, the local chamber may be formed between the deformable element and the original blade surface. For example, the local chamber may be formed between the deformable element and the inner element. Air may passively enter or exit this local chamber as the airfoil modifying device is deformed due to the local air pressure. This allows the pressure differential between the internal air pressure and the local air pressure to be equalised.

When the local air pressure exceeds the internal pressure, then the deformable element may be deformed and thus pushed towards the retracted position. As the internal pressure and the local air pressures equalises via the semipermeable structure or the above means, the deformation may be stopped. When the local air pressure drops below the internal pressure, then the deformable element may be deformed and thus sucked towards the extended position. As the internal pressure and the local air pressures equalises again or when the deformable element reaches its outer profile, the deformation may be stopped.

The deformable element may be arranged to freely deform relative to the original blade surface, thereby allowing it to freely adapt to the pressure distribution over the blade surface. This allows the deformable element to be shaped into any outer profile.

According to one embodiment, a filler element of said at least one airfoil modifying device substantially is arranged within said local chamber, wherein said filler element, when extended, forms a predetermined outer profile of the deformable element.

The filler element may be arranged within this local chamber, wherein the filler element may be deformed together with the deformable element. The filler element may in its compact state define a retracted outer profile of the deformable element. This retracted outer profile may substantially follow the profile of the original blade surface so that the airfoil modifying device does not influence the aerodynamic performance when retracted. The filler element may in its extended state define an extended outer profile of the deformable element. This extended outer profile may be selected dependent of the original airfoil profile and there geometrical parameters thereof. This limits the free movement of the deformable element and guides it into a desired outer profile.

The filler element may be used to provide support for the deformable element during deformation. This may reduce the wear and tear of the deformable element.

According to one embodiment, said at least one airfoil modifying device comprises integrated flanges attached to the blade shell, or comprises first coupling elements engaging second coupling elements arranged on the wind turbine blade.

The airfoil modifying device may comprise means for attachment to the wind turbine blade. The means may be configured to secure the deformable element and/or the inner element to the wind turbine blade, e.g. the blade shell.

For example, the airfoil modifying device may comprise one or more flanges arranged at the peripheral edge used for attachment to the blade shell. The flanges may be integrally formed by the deformable element and/or the inner element. The flanges may be attached to the blade shell using adhesive, bolts, screws or other suitable attachments. This allows for a secure connection to the wind turbine blade.

For example, the airfoil modifying device may comprise mechanical coupling elements configured to engage matching coupling elements arranged on the wind turbine blade, e.g. the blade shell. The airfoil modifying device may comprise one or more first coupling elements, e.g. hooks, either integrally formed or connected to the airfoil modifying device. The wind turbine may comprise one or more second coupling elements, e.g. holes or eyes, for engaging the first coupling elements.

The coupling elements may suitably be sealed or covered to minimize the impact of the local airflow and prevent water or dust from entering the interior of the wind turbine blade. For example, a deformable bushing may be arranged in the holes of the blade shell. For example, a cover element may be arranged over the engaging coupling elements. Other types of seal or cover may also be used.

The coupling elements may suitably extend partly or fully into the interior of the wind turbine blade, at least when placed in the retracted position. This allows the aerodynamic effect not to be adversely affected by the coupling elements. In the extended position, the coupling elements may suitably remain concealed within the wind turbine blade or extend partly out of the wind turbine blade.

Optionally, the coupling elements may further be configured to break off at a predetermined local air pressure or tension force. For example, this predetermined local air pressure or tension force may suitably be select to prevent any structural damages to the wind turbine blades. This allows the wind turbine blade to continue to function virtually unaffected by the failure of the coupling element. Preferably, the coupling elements should be configured to provide a relative clear break surface to minimize the effect of the local airflow.

According to one embodiment, said at least one airfoil modifying device comprises a first airfoil modifying device and at least a second airfoil modifying device, wherein said at least second airfoil modifying device is arranged relative to the first airfoil modifying device along the original blade surface.

A plurality of airflow modifying devices may suitably be arranged on the wind turbine blade, e.g. on the pressure or suction side. The individual airfoil modifying devices may be arranged relative to each other, e.g. spaced apart or abutting each other, in the longitudinal direction and/or in the chordwise direction. The individual airfoil modifying devices may thus be passively deformed by the local air pressure over the respective blade surface, as described earlier. This allows for easier handling of the individual airfoil modifying devices. This may also reduce the size and weight of each airfoil modifying device.

The individual airfoil modifying devices may each define an outer profile defined by the deformable element, or a combined outer profile defined by the individual deformable elements. This allows the placement and outer profile of the airfoil modifying devices to be adapted to the original airfoil profile.

The airflow modifying device or devices may suitably be arranged on any blade surface likely to suffer from the negative effects of having large surface gradients. For example, the airflow modifying device may be arranged at surface areas having the maximum surface gradients. Alternatively or additionally, the airflow modifying device may be arranged at the outermost blade surface area, i.e. between 90% of 100% of the blade length measured from the blade root.

One object is further achieved by a method of modifying airfoil profile of a wind turbine blade, the wind turbine blade extending from a blade root to a tip end in a longitudinal direction and further from a leading edge to a trailing edge in a chordwise direction, the wind turbine blade comprising a blade shell having an original airfoil profile defining a pressure side and a suction side, the wind turbine blade is configured as described above, wherein said method comprises the steps of:
- operating said wind turbine blade according to an angle of attack,
- passively modifying said original airfoil profile at predetermined angles of attack by deforming the at least one airfoil modifying device in a local flapwise direction by means of a local air pressure acting on said one of said pressure and suction sides.

This provides a method of passively modifying the original airfoil profile, during operation, as a function of the local air pressure acting on the blade surface. Here, the term 'operation' includes any power producing modes or another mode in which the wind turbine blade is pitched to a predetermined pitch angle. The airflow modifying device may optionally also be activated at certain stand-still conditions.

The wind turbine blade is operated within a range of angles of attack defined by a lower end value and an upper end value. When operated within a first sub-range of angles of attack, the local air pressure pushes the deformable element of the airflow modifying device towards the retracted position. This in turn causes the volume of the local chamber to decrease. Thereby, allowing the local airflow to substantially follow the original airfoil profile. The airflow modifying device may in this position have no significant effect on the aerodynamic performance of the wind turbine blade.

The first sub-range may be defined by a predetermined lower value and an upper value, e.g. the upper end value. The predetermined lower value may depend on the geometric properties of the original airfoil profile and may indicate the angle of attack at which the device may be activated, e.g. starting to extend.

The internal air pressure may be equalised relative to the local air pressure during the deformation by guiding air out of or into the local chamber, e.g. via the semipermeable structure or via the vent holes. Alternatively, the internal air pressure may increase or decrease until it reaches the same level as the local air pressure after which the deformation is stopped.

According to one embodiment, said predetermined angles of attack are negative angles of attack, preferably very low angles of attacks.

The wind turbine blade may further operated with a second sub-range of angles of attack, where the local air pressure may generate a negative lift and thus a suction effect on the airfoil modifying device. The pressure side may thus function as the suction side, and vice versa.

The second sub-range may be defined by a lower value, e.g. the lower end value, and the predetermined lower value. This second sub-range may define a set of very low angles of attack for that wind turbine blade at which the airflow modifying device may be deployed, e.g. extended.

This in turn moves the deformable element towards the extended position, thereby causing the volume of the local chamber to increase and the airflow modifying device to modify the original airfoil profile. The local airflow then follows this modified airfoil profile which, in turn, alters the aerodynamic performance of the wind turbine blade.

DESCRIPTION OF DRAWINGS

The invention is explained in detail below with reference to embodiments shown in the drawings, in which.

LIST OF REFERENCES

Figure 1:
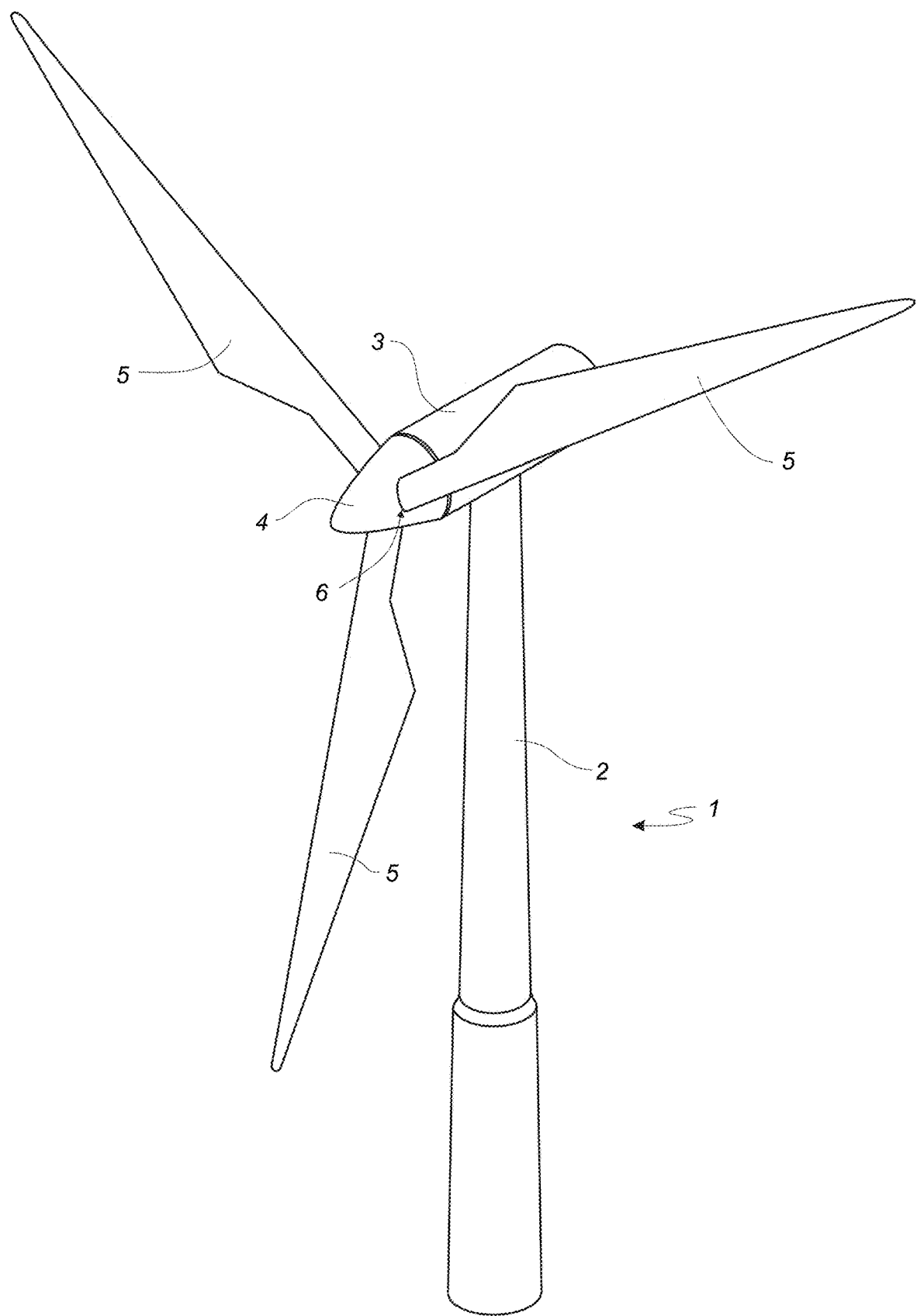
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. Length of wind turbine blade
18. Chord length of wind turbine blade
19. Airfoil modifying device
20. Chord line
21. First edge
22. Second edge
23. Camber line
24. First end
25. Second end
26. First coupling elements
27. Second coupling elements
28. Flanges
29. Filler element
30. Deformable element
31. Local chamber
32. Original blade surface
32a. Inner element
33. Means for guiding air into and out of local chamber
α Angle of attack
W Wind direction The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2, e.g. via a yaw bearing unit. The rotor comprises a hub 4 and a number of wind turbine blades 5. Here three wind turbine blades are shown, but the rotor may comprise more or fewer wind turbine blades 5. The hub 4 is connected to a drive train, e.g. a generator, located in the wind turbine 1 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
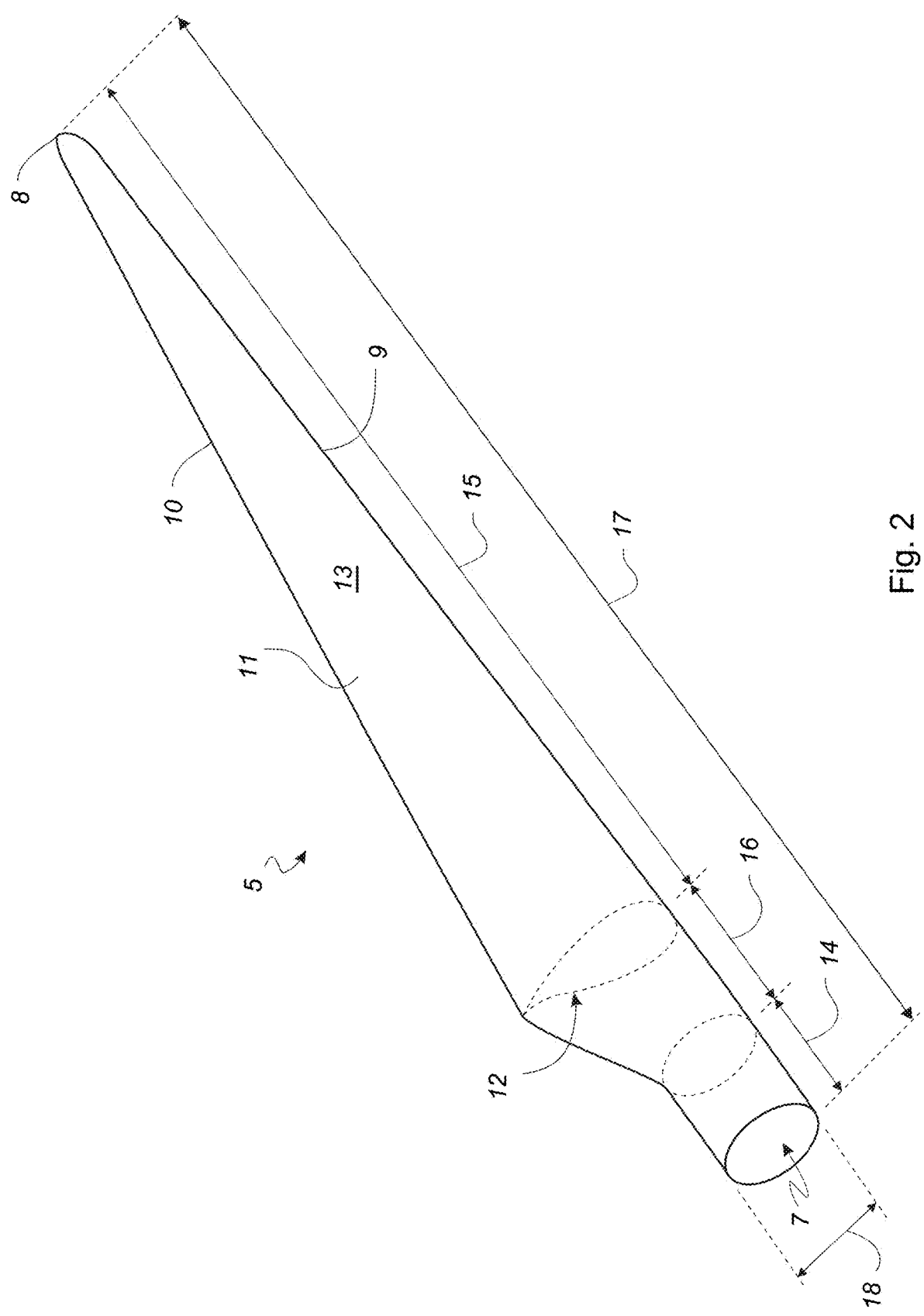
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing side surfaces defining a pressure side 12 and a suction side 13 respectively. The blade shell 11 further defines a blade root portion 14, an aerodynamic blade portion 15, and a transition portion 16 between the blade root portion 14 and the aerodynamic blade portion 15.

The blade root portion 14 has a substantially circular or elliptical cross-section (indicated by dashed lines). The blade root portion 14 together with a load carrying structure, e.g. a main laminate combined with a shear web or a box beam, are configured to add structural strength to the wind turbine blade 5 and transfer the dynamic loads to the hub 4. The load carrying structure extends between the pressure side 12 and the suction side 13 and further in the longitudinal direction.

The blade aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition portion 16.

The wind turbine blade 5 has a longitudinal length 17 of at least 35 metres, preferably at least 50 metres. The wind turbine blade 5 further has a chord length 18 as function of the length 17, wherein the maximum chord length is found between the blade aerodynamic blade portion 15 and the transition portion 16. The wind turbine blade 5 further has a blade thickness 19 as function of the chord length 18, wherein the blade thickness 19 is measured between the pressure side 12 and the suction side 13.

Figure 3:
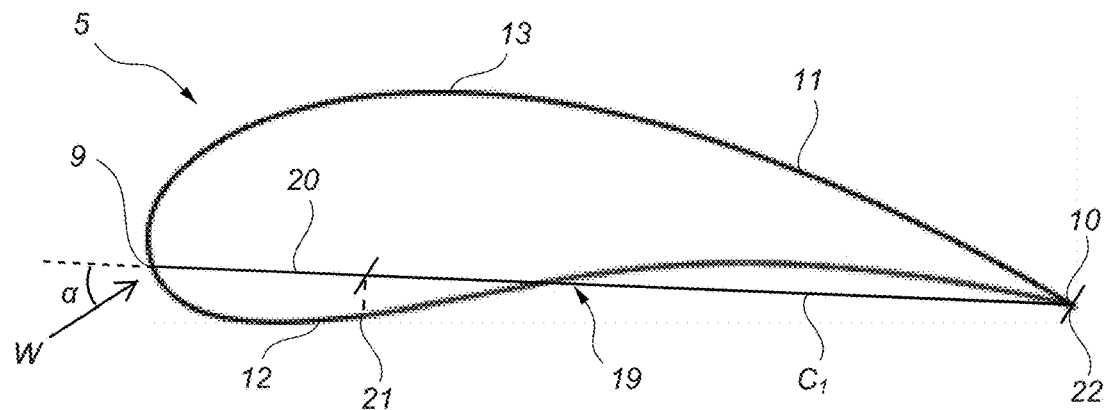
FIG. 3 shows the wind turbine blade with a airfoil modifying device in a retracted position.

FIG. 3 shows an exemplary cross-sectional profile of the wind turbine blade 5 with a airfoil modifying device 19 arranged on the pressure side 12. The airfoil modifying device 19 is formed as a flexible device configured to passively deform relative to the blade surface of the pressure side 12 when influenced by the local air pressure. Here, the airfoil modifying device 19 is partly or fully made of an elastic material or composite. The wind turbine blade 5 is operated according to an angle of attack, α, of the wind, W, acting on the wind turbine blade 5.

The airfoil modifying device 19 has local width $C_1$ measured along the chord line 20 from a first edge 21 facing the leading edge 9 to a second edge 22 facing the trailing edge 10. Here, the airfoil modifying device 19 is arranged adjacent to the trailing edge 10 and extend partly along the pressure side 12. The first edge is positioned at a predetermined distance from the leading edge 9, as illustrated in FIGS. 3-4.

The wind turbine blade 5 has an original airfoil profile formed by the blade shell 11 and thus the original blade surfaces. The profile of the airfoil modifying device 19 is passively deformed by means of the local air pressure acting on its outer surface. Here, the airfoil modifying device 19 is placed in a retracted position in which it substantially follows the original airfoil profile of the wind turbine blade 5, as illustrated in FIG. 3. In this position, the local air flow substantially follows the original airfoil profile along the pressure side 12.

Figure 4:
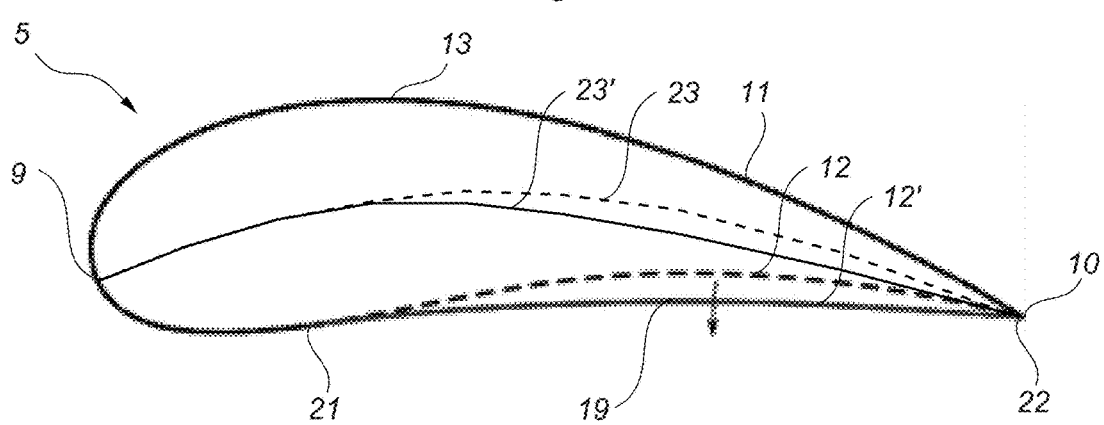
FIG. 4 shows the wind turbine blade with the airfoil modifying device in an extended position.

FIG. 4 shows the wind turbine blade 5 with the airfoil modifying device 19 placed in an extended position, wherein the airfoil modifying device 19 is deformed (indicated by arrow) relative to the original blade surface due to the local air pressure. Thereby, modifying the original blade surface and, in turn, also modifying the original airfoil profile of the wind turbine blade 5. In this position, the local air flow substantially follows this modified airfoil profile along the modified pressure side 12'.

The wind turbine blade 5 has an original camber line 23 extending from the leading edge 9 to the trailing edge 10.

The camber line 23 is defined by the original airfoil profile of the wind turbine blade 5. When activated, the modified airfoil profile formed by the airfoil modifying device 19 further forms a modified camber line 23'. Thereby, reducing the cambered profile of the wind turbine blade 5 at negative $A_O A_S$.

In this configuration, the airfoil modifying device comprises a deformable element (see FIG. 8) configured to move freely between the first and second edges 21, 22. The deformable element is configured to function as a semipermeable membrane. Thereby, enabling it to adapt to the local air flow acting on the pressure side 12, 12'. When extending, air is guided into a local chamber formed between the original blade surface (see FIG. 8) and the deformable element via the semipermeable membrane. When retracting, air is guided out of the local chamber via the semipermeable membrane.

Figure 5:
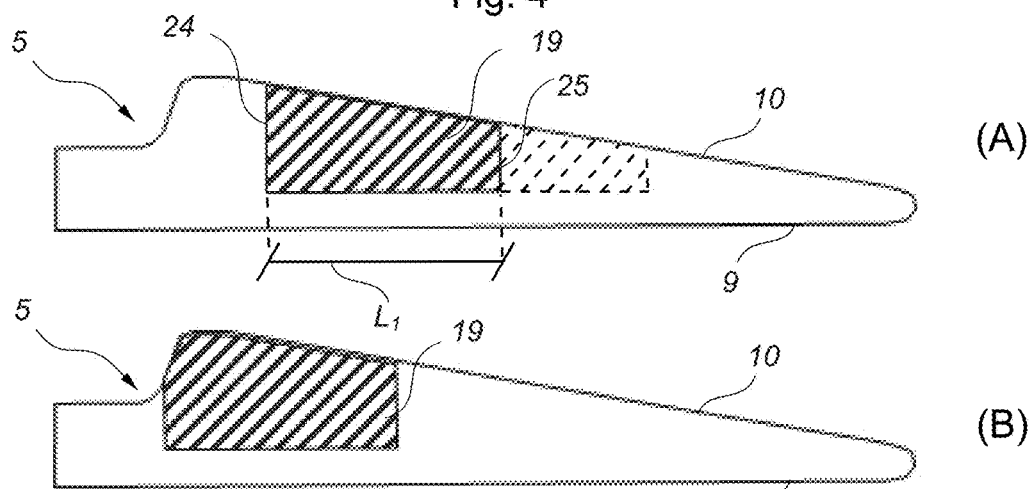
FIG. 5a-b show two alternative placements of the airfoil modifying device.

FIG. 5a shows a first placement of the airfoil modifying device 19 and FIG. 5b shows a second placement of the airfoil modifying device 19. The airfoil modifying device 19 has local length $L_1$ measured between a first end 24 facing the blade root 7 to a second end 25 facing the tip end 8.

In FIG. 5a, the airfoil modifying device 19 is arranged fully on the aerodynamic blade portion 15 of the wind turbine blade 5. In FIG. 5b, the airfoil modifying device 19 is arranged partly on the aerodynamic blade portion 15 and partly on the transition portion 16 of the wind turbine blade 5.

As indicated in FIG. 5a, a plurality (indicated by dashed lines) of airfoil modifying devices 19 may be arranged on the pressure side 12. The individual airfoil modifying devices 19 are all passively deformed by means of the local air pressure at the pressure side.

Figure 6:
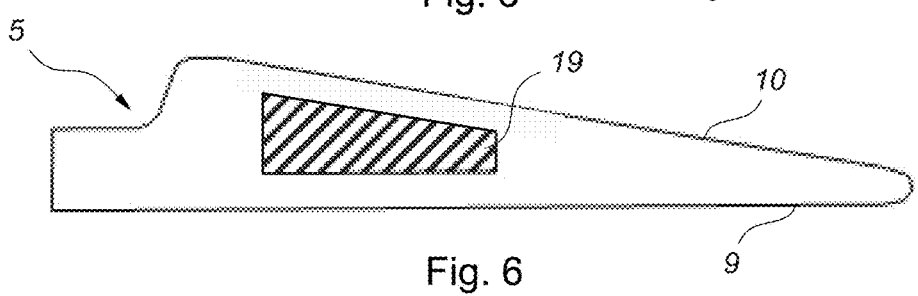
FIG. 6 shows a third alternative placement of the airfoil modifying device.

FIG. 6 shows a third placement of the airfoil modifying device 19 where the airfoil modifying device 19 is arranged between the leading and trailing edges 9, 10 of the wind turbine blade 5. Here, the first edge 21 is positioned at a predetermined distance from the leading edge 9. Further, the second edge 22 is positioned at a predetermined distance from the trailing edge 10.

As illustrated in FIGS. 5a, 5b and 6, the local width $C_1$ of the airfoil modifying device 19 varies along the length of the wind turbine blade 5. The second edge 22 is thereby adapted to follow the trailing edge 10 profile of the wind turbine blade 5.

Figure 7A:
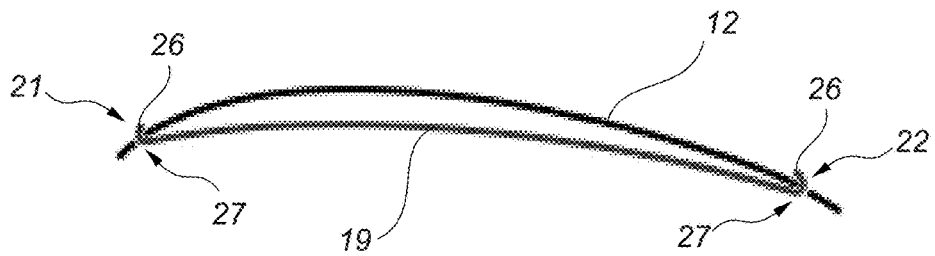
FIG. 7a-b show two alternative attachments of the airfoil modifying device.
Figure 7B:
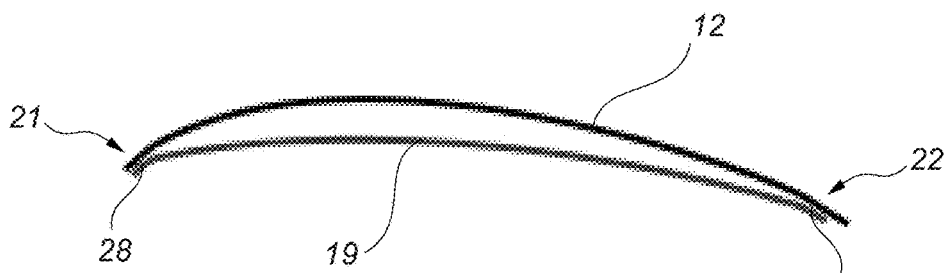

FIG. 7a-b show two alternative attachments of the airfoil modifying device 19. the airfoil modifying device 19 is connected to the wind turbine blade 5, e.g. to the pressure side 12, at attachment points along the first and second edges 21, 22.

In FIG. 7a, the airfoil modifying device 19 comprises first coupling elements 26 configured to engage second coupling elements 27 arranged on the wind turbine blade 5. Here, the first coupling elements 26 are shaped as hooks or J-shaped edges. The second coupling elements 27 are shaped as matching holes or eyes formed in the blade shell 11. The attachment points are optionally sealed off using a sealant or a deformable sealing element, e.g. a deformable bushing or sleeve.

In FIG. 7b, the airfoil modifying device 19 comprises integrated flanges 28 projecting from the first and second edges 21, 22 respectively. The flanges 28 are configured to be attached to the blade shell 11 using adhesive or suitable fasteners, such as bolts.

In both FIGS. 7a-b, the airfoil modifying device 19 is connected to the wind turbine blade 5, e.g. to the pressure side 12, at further attachment points along the first and second ends 24, 25. These attachment points are configured similarly to those shown in FIGS. 7a-b.

Figure 8:
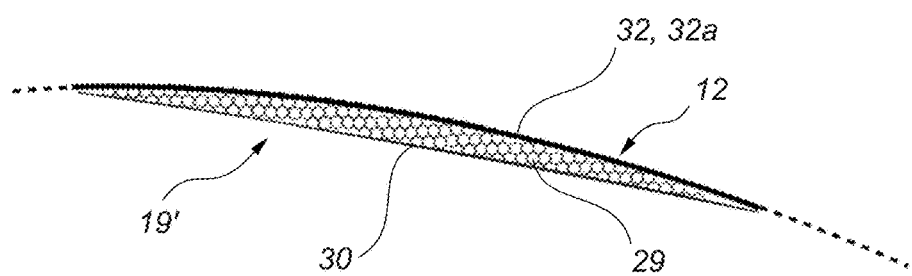
FIG. 8 shows a second embodiment of the airfoil modifying device.

FIG. 8 shows a second embodiment of the airfoil modifying device 19'. In this configuration, the airfoil modifying device 19 further comprises a filler element 29 arranged in the local chamber 31 formed between the deformable element 30 and the original blade surface 32. The filler element 29 is made of a flexible material or composite.

The filler element 29 is configured to add support to the deformable element 30 and to guide it into a desired extended profile. Thereby, allowing the wind turbine blade 5 to transform into a desired modified airfoil profile when the airfoil modifying device 19' is deformed by the local air pressure.

Here, the filler element 29 has a honeycomb shaped structure forming a plurality of open cells. This honeycomb shaped structure acts as a thin and flexible structure capable of deforming together with the deformable element 30.

An optional inner element 32a extends along the inner surface of the filler element 29. The inner element 32a is connected to the filler element 29 and further to the deformable element 30.

Figure 9A:
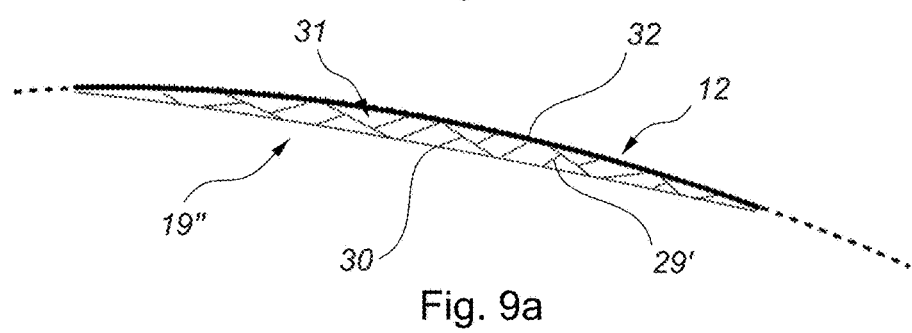
FIG. 9a-b show a third embodiment of the airfoil modifying device in the retracted position and the extended position.
Figure 9B:
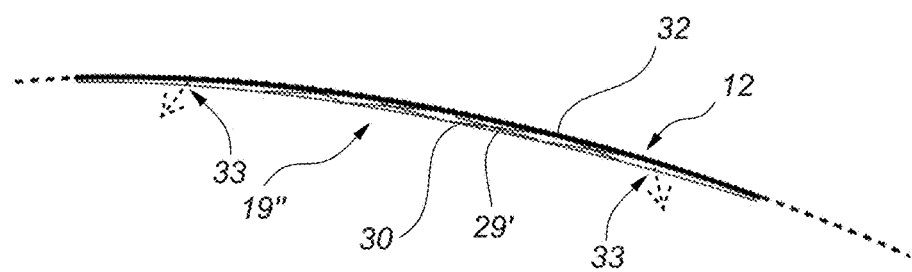

FIG. 9a-b show a third embodiment of the airfoil modifying device 19'' placed in a retracted position and in an extended position. Here, the filler element 29' has an alternative thin and flexible structure.

The filler element 29' has a different open celled structure configured to deform, e.g. retract, into a compact state, so that the profile of the airfoil modifying device 19' substantially follows the original airfoil profile, as illustrated in FIG. 9b. When placed in the compact state, the deformable element 30 will substantially adapt to the shape of the original airfoil profile.

This open celled structure is further configured to deform, e.g. extend, into a deployed state, wherein the filler element 29' forms a predetermined outer profile. The deformable element 30 will follow this outer profile and thus form a desired outer profile, as illustrated in FIG. 9a. Thereby, forming a modified blade surface of the wind turbine blade 5.

The deformable element 30 is formed as a semipermeable membrane, as indicated in FIG. 4, enabling air to be passively guided into or out of the local chamber 31 and thus the open celled structure formed by the filler element 29, 29'. Alternatively, the deformable element 30 may comprise means 33, e.g. integrated vent holes, configured to passively guide air into and out of the local chamber and, optionally, the open celled structure (indicated by dotted arrows).

The abovementioned embodiments may be combined in any combinations without deviating from the present invention.

The invention claimed is:

1. An airfoil profile modifying device (19) for a wind turbine blade (5), the wind turbine blade (5) comprising a blade shell (11) having an original airfoil profile which defines a pressure side (12) and a suction side (13), wherein the airfoil profile modifying device (19) is configured to be arranged on the pressure side (12) or suction side (13) of said wind turbine blade (5) and to modify said original airfoil profile to produce a modified airfoil profile, the airfoil profile modifying device (19) comprising:
a deformable element (30) comprising a semipermeable membrane, wherein air is able to pass through said semipermeable membrane; and
means for attaching the deformable element (30) to the wind turbine blade (5), whereby the deformable element (30) is adapted for attachment to the wind turbine blade (5) such that the deformable element (30) extends along said pressure side or said suction side (12, 13) from a first edge (21) to a second edge (22), and further from a first end (24) to a second end (25) when attached, wherein said deformable element (30) is configured to deform between a retracted position and an extended position, and wherein the deformable element (30) is passively deformed, when attached, by means of a local external air pressure acting on an outer surface of said airfoil modifying device (19) and equalization of pressure between an interior and an exterior of the deformable element (30) by the air passing through the semipermeable membrane due to a pressure difference between the interior and the exterior of the deformable element (30), the modified airfoil profile produced by the airfoil profile modifying device (19) having smooth and continuous pressure side and suction side surface profiles.

2. The airfoil profile modifying device according to claim 1, wherein the airfoil modifying device (19) further comprises a filler element (29) connected to said deformable element (30), wherein said filler element (29) is further configured to deform between said retracted position and said extended position.

3. The airfoil profile modifying device according to claim 2, wherein said filler element (29) comprises an open cell structure.

4. The airfoil profile modifying device according to claim 1, wherein said deformable element (30) comprises means (33) for passively guiding air into and out of a local chamber, when attached, formed by said deformable element (30) and an original blade surface of the wind turbine blade (5).

5. A wind turbine blade (5) extending from a blade root (7) to a tip end (8) in a longitudinal direction and further from a leading edge (9) to a trailing edge (10) in a chordwise direction, the wind turbine blade (5) comprising a blade shell (11) having an original airfoil profile which defines a pressure side (12) and a suction side (13), wherein at least one airfoil profile modifying device (19) is arranged on one of said pressure and suction sides (12, 13) and attached to said wind turbine blade (5), the at least one airfoil profile modifying device (19) comprising a deformable element (30) which comprises a semipermeable membrane, wherein air is able to pass through said semipermeable membrane, whereby the deformable element (30) is adapted for attachment to the wind turbine blade (5) such that the deformable element (30) extends along said pressure side or said suction side (12, 13) from a first edge (21) to a second edge (22), and further from a first end (24) to a second end (25), wherein said deformable element (19) is configured to deform between a retracted position and an extended position, wherein the deformable element (30) is passively deformed by means of a local external air pressure acting on an outer surface of said pressure side or said suction side (12, 13) and equalization of pressure between an interior and an exterior of the deformable element (30) by the air passing through the semipermeable membrane due to a pressure difference between the interior and the exterior of the deformable element (30), the original airfoil profile being modified by deformation of the at least one airfoil modifying device (19) relative to an original blade surface in a local flapwise direction to produce a modified airfoil profile having smooth and continuous pressure side and suction side surface profiles.

6. The wind turbine blade according to claim 5, wherein the deformable element (30) of said at least one airfoil profile modifying device (19) and the original blade surface form a local chamber, wherein a volume of said chamber is changed as function of said local air pressure.

7. The wind turbine blade according to claim 6, wherein a filler element (29) of said at least one airfoil profile modifying device (19) substantially is arranged within said local chamber, wherein said filler element (29), when extended, forms a predetermined outer profile of the deformable element (30).

8. The wind turbine blade according to claim 5, wherein said at least one airfoil profile modifying device (19) comprises integrated flanges (28) attached to the blade shell (11), or comprises first coupling elements (26) engaging second coupling elements (27) arranged on the wind turbine blade (5).

9. The wind turbine blade according to claim 5, wherein said at least one airfoil profile modifying device (19) comprises a first airfoil modifying device and at least a second airfoil modifying device, wherein said at least second airfoil modifying device is arranged relative to the first airfoil modifying device along the original blade surface.

10. A method of modifying an airfoil profile of a wind turbine blade, the wind turbine blade (5) extending from a blade root (7) to a tip end (8) in a longitudinal direction and further from a leading edge (9) to a trailing edge (10) in a chordwise direction, the wind turbine blade (5) comprising a blade shell (11) having an original airfoil profile defining a pressure side (12) and a suction side (13), wherein the wind turbine blade (5) is configured according to claim 6, wherein said method comprises the steps of:
operating said wind turbine blade (5) according to an angle of attack; and
passively modifying said original airfoil profile at predetermined angles of attack by deforming the at least one airfoil modifying device (19) in a local flapwise direction by means of a local air pressure acting on said one of said pressure and suction sides (12, 13) to produce the modified airfoil profile having the smooth and continuous pressure side and suction side surface profiles.

11. The method according to claim 10, wherein said predetermined angles of attack are negative angles of attack.

12. The method according to claim 11, wherein said predetermined angles of attack are very low negative angles of attack.

13. An airfoil profile modifying device (19) for a wind turbine blade (5), the wind turbine blade (5) comprising a blade shell (11) having an original airfoil profile which defines a pressure side (12) and a suction side (13), wherein the airfoil profile modifying device (19) is configured to be arranged on the pressure side (12) or suction side (13) of said wind turbine blade (5) and to modify said original airfoil profile to produce a modified airfoil profile, the airfoil profile modifying device (19) comprising:
a deformable element (30) comprising a semipermeable membrane, wherein air is able to pass through said semipermeable membrane; and
means for attaching the deformable element (30) to the wind turbine blade (5),
whereby the deformable element (30) is adapted for attachment to the wind turbine blade (5) such that the deformable element (30) extends along said pressure side or said suction side (12, 13) from a first edge (21) to a second edge (22), and further from a first end (24) to a second end (25) when attached, wherein said deformable element (30) is configured to deform between a retracted position and an extended position, and wherein the deformable element (30) is passively deformed, when attached, by means of a local external air pressure acting on said airfoil modifying device (19) and equalization of pressure between an interior and an exterior of the deformable element (30) by the air passing through the semipermeable membrane due to a pressure difference between the interior and the exterior of the deformable element (30), the modified airfoil profile produced by the airfoil profile modifying device (19) having smooth and continuous pressure side and suction side surface profiles.

* * * * *